United States Patent
DeReus

(10) Patent No.: US 8,319,393 B2
(45) Date of Patent: Nov. 27, 2012

(54) REDUCED VOLTAGE MEMS ELECTROSTATIC ACTUATION METHODS

(75) Inventor: Dana Richard DeReus, Irvine, CA (US)

(73) Assignee: Wispry, Inc., Irvine, CA (US)

( * ) Notice: Subject to any disclaimer, the term of this patent is extended or adjusted under 35 U.S.C. 154(b) by 308 days.

(21) Appl. No.: 12/689,915

(22) Filed: Jan. 19, 2010

(65) Prior Publication Data
US 2010/0181866 A1 Jul. 22, 2010

Related U.S. Application Data

(60) Provisional application No. 61/145,712, filed on Jan. 19, 2009.

(51) Int. Cl.
*H02N 1/00* (2006.01)
(52) U.S. Cl. ....................................................... 310/309
(58) Field of Classification Search .................. 310/309; 359/223.1, 224.1, 290
See application file for complete search history.

(56) References Cited

U.S. PATENT DOCUMENTS

| | | | |
|---|---|---|---|
| 6,307,169 B1 * | 10/2001 | Sun et al. | ........................ 200/181 |
| 6,329,738 B1 | 12/2001 | Hung et al. | |
| 6,377,438 B1 | 4/2002 | Deane et al. | |
| 6,625,004 B1 | 9/2003 | Musolf et al. | |
| 6,671,078 B2 | 12/2003 | Flanders et al. | |
| 2003/0015936 A1 * | 1/2003 | Yoon et al. | ........................ 310/309 |
| 2006/0226732 A1 * | 10/2006 | Savic et al. | ........................ 310/309 |
| 2007/0216987 A1 | 9/2007 | Hagood et al. | |

OTHER PUBLICATIONS

International Search Report, date of mailing May 25, 2010, International application No. PCT/US2010/021405, International filed Jan. 19, 2010.

* cited by examiner

*Primary Examiner* — Nguyen N Hanh
(74) *Attorney, Agent, or Firm* — Jenkins, Wilson, Taylor & Hunt, P.A.

(57) ABSTRACT

Cantilever beam electrostatic actuators are disclosed. A cantilever beam electrostatic actuator in accordance with the present invention comprises an actuator beam having a first width at a support anchor point and a second width at a distal end of the actuator, wherein the first width is narrower than the second width. Another actuator in accordance with the present invention comprises an actuator region, having a first width, a beam, having a second width, coupled between an edge of the actuator region and a pivot point, the beam being approximately centered on the actuator region, wherein the second width is narrower than the first width, and at least one auxiliary actuator flap, coupled to the actuator region, the at least one auxiliary actuator flap coupled to the actuator region along the edge of the actuator region, the at least one auxiliary actuator flap being farther away from a centerline of the actuator than the beam.

16 Claims, 11 Drawing Sheets

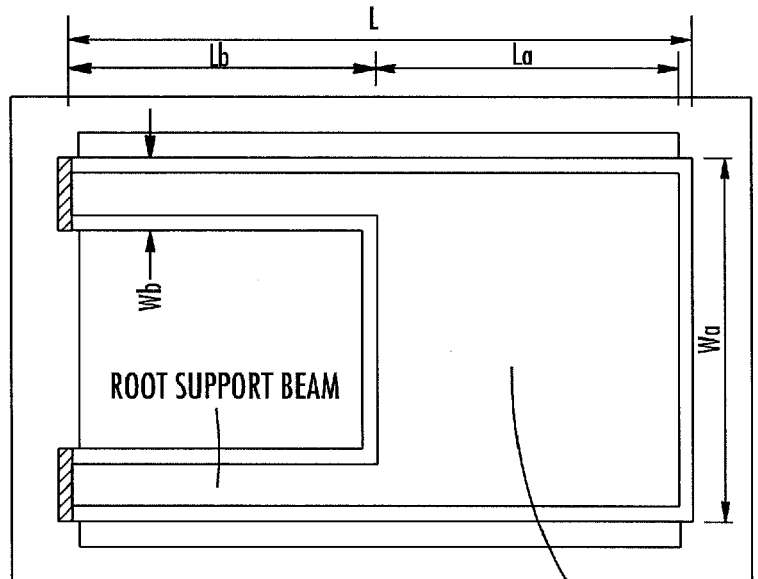
FIG. 5A — PRIMARY ACTUATOR REGION
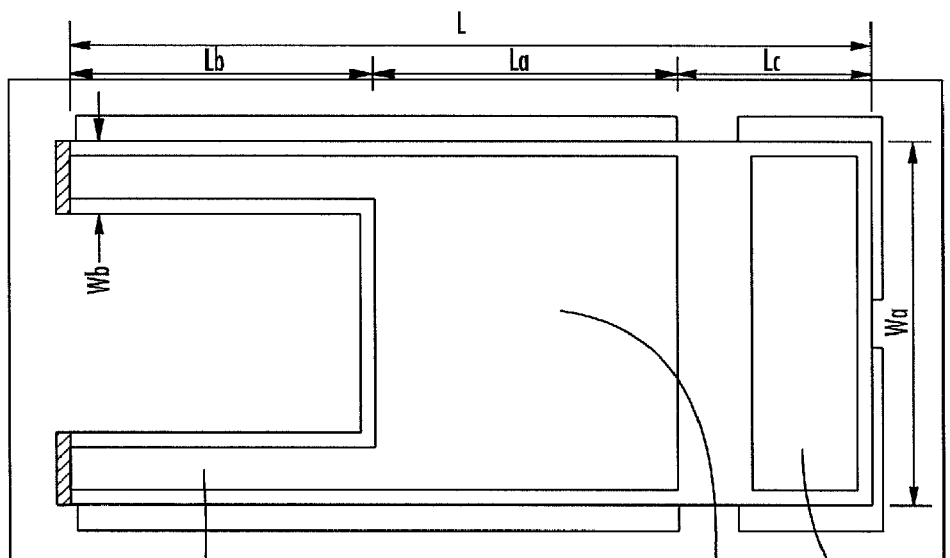
FIG. 5B — ROOT SUPPORT BEAM, PRIMARY ACTUATOR REGION, CAPACITIVE SWITCH HEAD

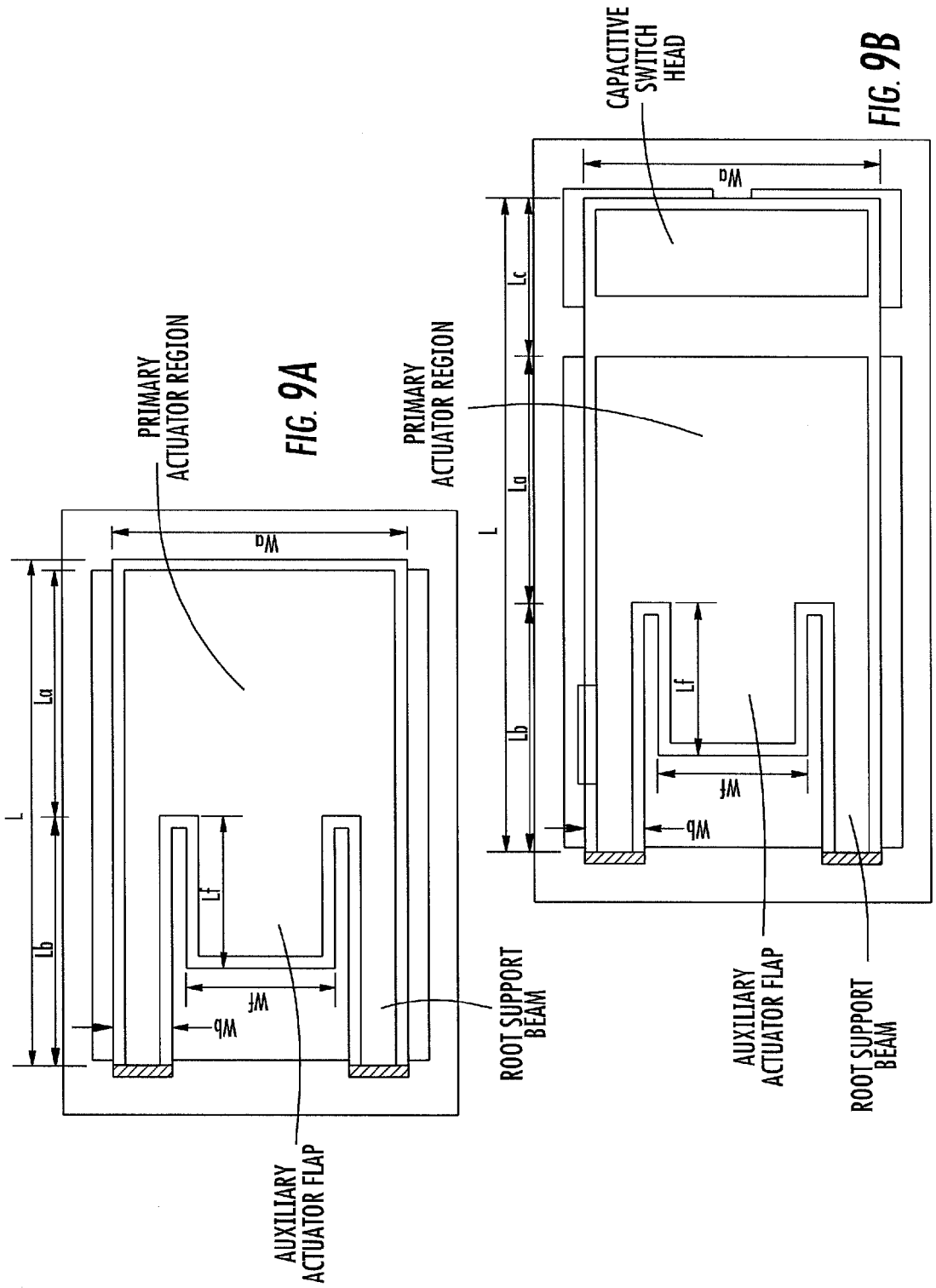

REDUCED VOLTAGE MEMS ELECTROSTATIC ACTUATION METHODS

CROSS-REFERENCE TO RELATED APPLICATION

This application claims the benefit under 35 U.S.C. Section 119(e) of the following and commonly-assigned U.S. provisional patent application, which is incorporated by reference herein:

Provisional Patent Application Ser. No. 61/145,712, filed Jan. 19, 2009, by Dana R. DeReus, entitled "REDUCED VOLTAGE MEMS ELECTROSTATIC ACTUATION METHODS."

BACKGROUND OF THE INVENTION

1. Field of the Invention

The present invention relates generally to actuators used in electronic devices, and in particular to a folded cantilever beam electrostatic actuator, as well as and other analogous electrostatic actuators supported by the substrate at one or more points.

2. Description of the Related Art

Switching capabilities for electronic devices are essential features, and, presently, the focus of switch technology has been to use Micro-Electro-Mechanical Switches (MEMS) to reduce the size and power requirements for switches. These switches may have either ohmic or capacitive contacts.

MEMS switches, just like other switches, have design requirements and tradeoffs. MEMS switches often require a relatively low electrostatic actuation voltage due to available control voltages. However, adapting a typical MEMS design for this low voltage may lead to adhesion due to the low contact break force and also may be too susceptible to RF signal induced self-actuation. Such tradeoffs may eliminate many applications for MEMS switches, such as Tunable Matching Networks, Filters and Power Amplifiers.

It can be seen, then, that there is a need in the art for MEMS switches. It can also be seen that there is a need in the art for MEMS switches that have sufficient capabilities to expand the available applications for MEMS switches.

SUMMARY OF THE INVENTION

To minimize the limitations in the prior art, and to minimize other limitations that will become apparent upon reading and understanding the present specification, the present invention discloses cantilever beam electrostatic actuators and other analogous electrostatic actuators supported by the substrate at one or more points.

A cantilever beam electrostatic actuator in accordance with one or more embodiments of the present invention comprises a first actuator beam having a first width at a support anchor point and a second width at a distal end of the cantilever beam electrostatic actuator, wherein the first width is narrower than the second width, and a second actuator beam, wherein the first actuator beam and the second actuator beam are symmetric about a center line of the cantilever beam electrostatic actuator.

Such a cantilever beam electrostatic actuator may further optionally comprise a standoff feature, the standoff feature controlling a displacement of the first actuator beam, the first actuator beam motion upon actuation, the first actuator beam motion upon deactivation, at least one auxiliary actuator flap, coupled to the cantilever beam electrostatic actuator opposite the distal end of the cantilever beam electrostatic actuator, the at least one auxiliary actuator flap being coupled to the cantilever beam electrostatic actuator between the first actuator beam and the second actuator beam, and a standoff feature, the standoff feature controlling a displacement of the first actuator beam, the first actuator beam motion upon actuation, and the first actuator beam motion upon deactivation.

An actuator in accordance with one or more embodiments of the present invention comprises an actuator region, having a first width, a beam, having a second width, coupled between an edge of the actuator region and a pivot point, the beam being approximately centered on the actuator region, wherein the second width is narrower than the first width, and at least one auxiliary actuator flap, coupled to the actuator region, the at least one auxiliary actuator flap coupled to the actuator region along the edge of the actuator region, the at least one auxiliary actuator flap being farther away from a centerline of the actuator than the beam.

Such an actuator further may optionally comprise a standoff feature, the standoff feature controlling a displacement of the beam, beam motion upon actuation, and beam motion upon deactivation.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout:

FIG. 5A illustrates a second embodiment of a MEMS low voltage cantilever actuator in accordance with the present invention;

FIG. 5B illustrates the embodiment shown in FIG. 5 as used as a capacitive contact or ohmic (DC) contact switching device;

FIG. 9A illustrates a fourth embodiment of a MEMS low voltage cantilever actuator in accordance with the present invention;

FIG. 9B illustrates the embodiment of FIG. 9A used as a capacitive contact or ohmic (DC) contact switching device;

DETAILED DESCRIPTION OF THE PREFERRED EMBODIMENTS

Figure 1:
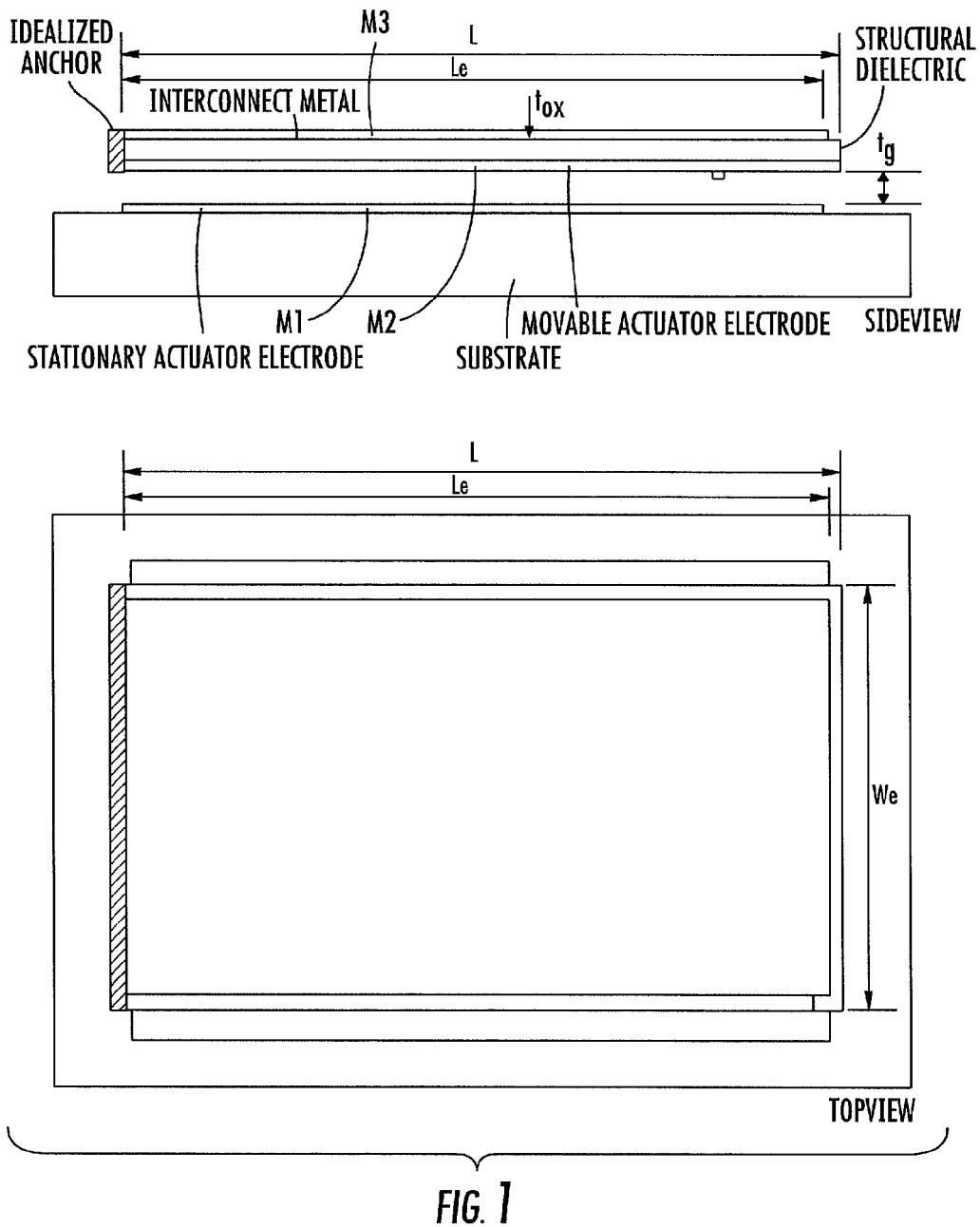
FIG. 1 illustrates a MEMS cantilever beam electrostatic actuator created in accordance with the present invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Fabrication of MEMS Actuators

The MEMS actuators and other devices discussed in this disclosure are typically made using an actuator having a trilayered beam. The devices discussed in this disclosure are not limited by the number of material layers comprising a beam actuator. They can be realized and implemented using a mono-layer, bi-layer or any other higher numbered multi-layered composite beam structure.

A mono-layer beam is typically made by forming a first electrode on a substrate, depositing a sacrificial layer on the first electrode and the substrate, forming a second structural electrode on the sacrificial layer, and removing a sufficient amount of the sacrificial layer so as to separate the second electrode from the substrate, wherein the structural electrode layer is supported by the substrate at a first end and is freely suspended above the substrate at an opposing second end as a cantilevered structure, or wherein the structural layer is supported by the substrate at two or more points. A bi-layer beam is typically made by forming a first electrode on a substrate, depositing a sacrificial layer on the first electrode and the substrate, forming a second electrode on the sacrificial layer, depositing a structural layer on the second electrode and the sacrificial layer, and removing a sufficient amount of the sacrificial layer so as to separate the second electrode from the substrate, wherein the structural layer is supported by the substrate at a first end and is freely suspended above the substrate at an opposing second end as a cantilevered structure, or wherein the structural layer is supported by the substrate at two or more points. A tri-layered beam, as primarily discussed in this disclosure, is typically made by forming a first electrode on a substrate, depositing a sacrificial layer on the first electrode and the substrate, forming a second electrode on the sacrificial layer, depositing a structural layer on the second electrode and the sacrificial layer, forming a via through the structural layer to the second electrode, depositing a conductive layer on the structural layer and in the via, forming a conductive microstructure by removing a portion of the conductive layer, wherein the conductive microstructure electrically communicates with the second electrode through the via, and removing a sufficient amount of the sacrificial layer so as to separate the second electrode from the substrate, wherein the structural layer is supported by the substrate at a first end and is freely suspended above the substrate at an opposing second end as a cantilevered structure, or wherein the structural layer is supported by the substrate at two or more points.

Side and Top Views of Cantilever Beam Actuator

A MEMS cantilever beam electrostatic actuator created in the tri-layered process described above is shown in FIG. 1. The substrate can be a conductor or semiconductor with the appropriate isolation material or an isolating dielectric substrate. The stationary actuator electrode is defined (deposited and patterned) by the metal layer on the substrate and is referred to as Metal 1 (M1). The moving actuator electrode is defined by the metal layer on top of the sacrificial layer and is referred to as Metal 2 (M2). The stationary and movable actuator electrodes are separated from each other by the "air" gap ($t_g$) as defined in FIG. 1 which is created upon the removal of the sacrificial layer. The primary beam structural layer is defined by the deposition and patterning of the structural dielectric material as shown in FIG. 1.

The structural dielectric ($SiO_2$, $Al_2O_3$, etc) can be any dielectric material that can be appropriately processed, provides excellent electrical isolation, and provides excellent mechanical properties. The thickness of the structural dielectric, $t_{ox}$, is a dimension that determines much of the mechanical behavior of the switch. On top of the structural dielectric layer, a third layer of metallization (M3) is defined that performs the function of electrical interconnection to the moving actuation electrode, and acts as a mechanical balance with the metallization on the underside of the beam. The actuator will work with any combination of metals and dielectric, so any metal or dielectric materials can be used for the various layers shown in FIG. 1. In the case of a single layer beam device the Metal 2 actuator electrode structural layer could be comprised of any conductive metal or semiconductor material.

Actuation of the Switch

Figure 2:
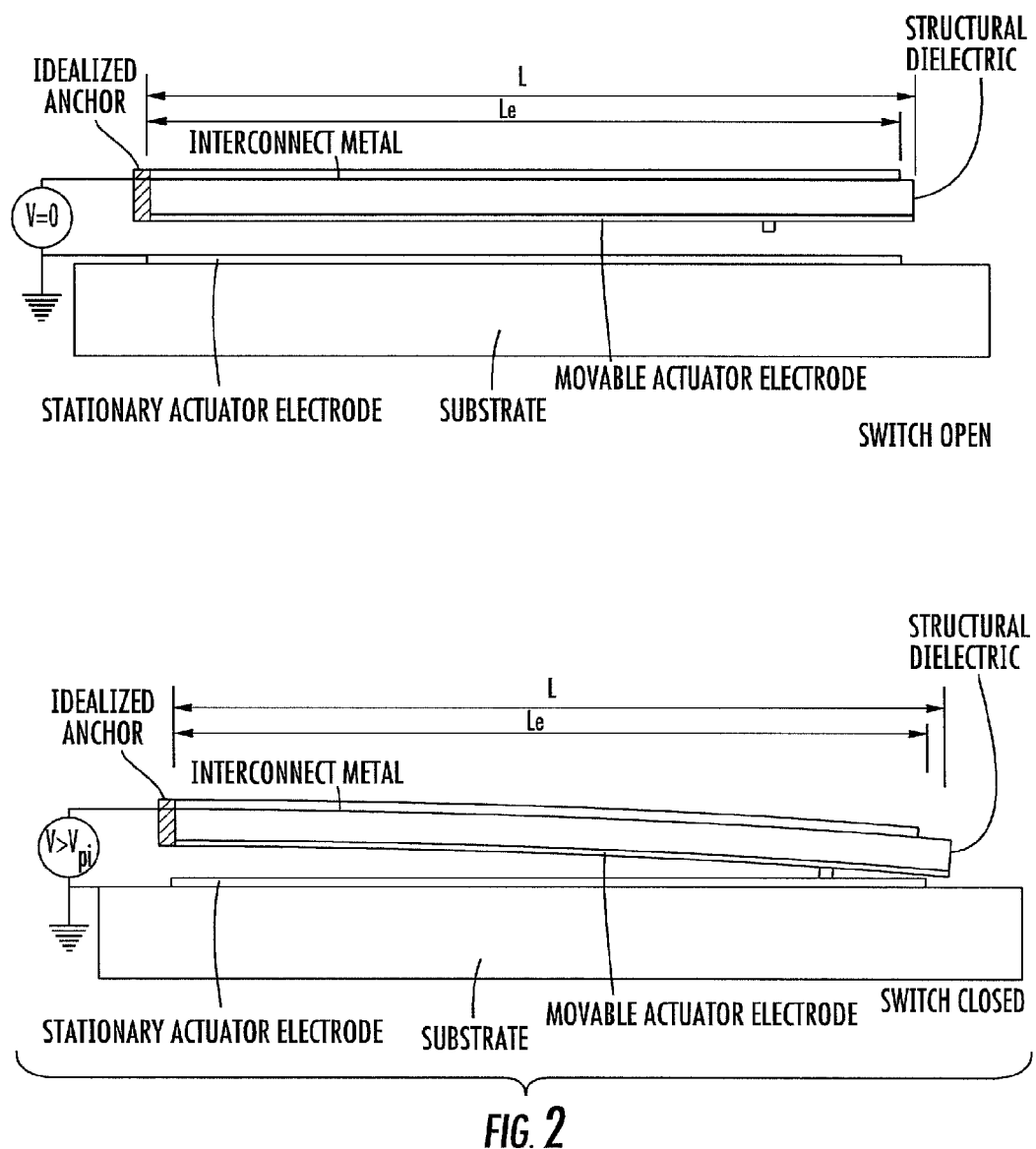
FIG. 2 illustrates actuation of the MEMS cantilever beam by applying a voltage potential difference between the stationary actuation electrode and the moving/bending actuation electrode.

Actuation is achieved by applying a voltage potential difference between the stationary actuation electrode and the moving/bending actuation electrode as shown in FIG. 2. The voltage source makes two connections: one connection (common) is made to the stationary actuation electrode and the second connection is made to the interconnect metal on top of the structure. The interconnect metal is electrically connected to the moving actuation electrode through a via. This means the electrostatic coupling is between the stationary and moving actuation electrodes across an "air" gap ("air" is any isolating fluid). The applied potential creates an electrostatic force which deflects the movable structure towards the stationary substrate in a non-linear yet stable manner until pull-in occurs, after which the actuator deflects to the substrate in an unstable fashion.

The unactuated "open" position shows the actuator in an undeflected position with a zero potential difference. The actuated "closed" position shows the actuator deflected into contact with the substrate with the potential difference greater than the pull-in voltage. Upon pull-in the stationary and movable actuator electrodes may come into contact with one another and short together. The stationary and movable actuator electrodes may be prevented from shorting together upon pull-in by introducing a continuous or patterned dielectric insulator on one or both of the actuation electrodes, or through the creation of standoff features that would prevent the two electrodes from coming into intimate contact with each other.

Standoff bumps, as described in U.S. Pat. No. 6,876,482, which is incorporated by reference herein, may be incorporated into any of the embodiments of the present invention in order to add functionality and/or improve reliability. Standoff bumps can add functionality by acting as mechanical pivot points for controlling rotational motion, or by limiting displacements of the various regions of the actuator. Standoff bumps can also improve device reliability when used to reduce/limit charging of dielectric material located between the stationary and movable actuator electrodes, especially when the actuator is in a "closed" state post pull-in, by helping to control the strength of the electric field through control of the spacing between actuator conductor plates, and also by helping to minimize dielectric to dielectric contact and associated triboelectric charging. In addition, standoff bumps may be used to help improve device reliability by decreasing contact area which in turn decreases the strength of the adhesive forces that in general lend themselves to reliability problems in MEMS devices.

Applications for MEMS Switches

Figure 3:
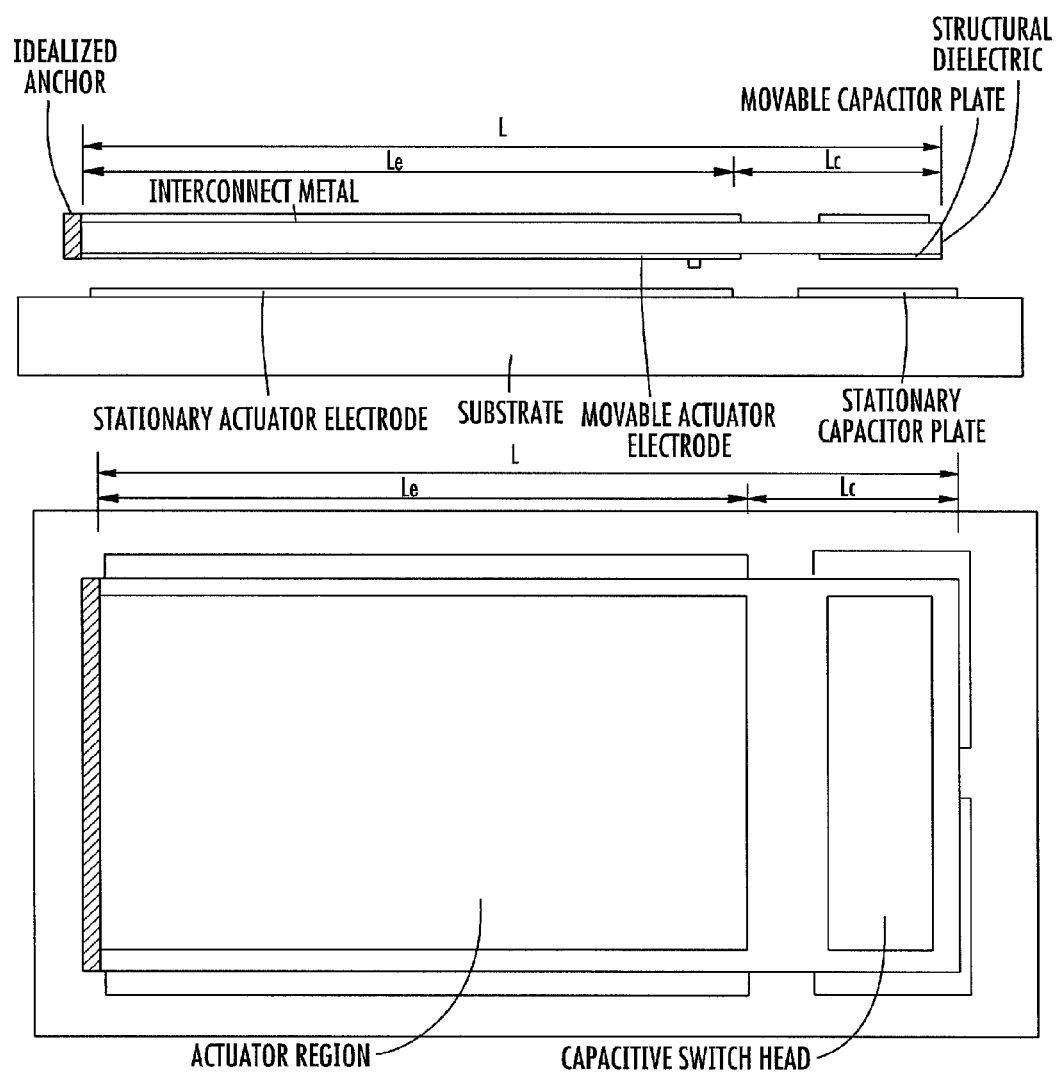
FIG. 3 illustrates a cantilever beam capacitive contact switch.

The MEMS cantilever electrostatic actuator depicted in FIGS. 1 and 2 may be used in applications for either a capacitive contact or ohmic (DC) contact switching device. An example of a cantilever beam capacitive contact switch is shown in FIG. 3. In this instance a variable signal capacitor consisting of a stationary capacitor plate on the substrate and a movable capacitor plate are located at the distal end of the cantilever beam. The electrostatic actuator motor is used to modulate the coupling between the stationary and movable capacitor plates by varying the spacing between the two conductors thus varying the value of the signal coupling capacitance.

Desirable aspects of an electrostatic MEMS actuator include, but are not limited to, low sensitivity to external packaging effects, low sensitivity to temperature variations, low sensitivity to process variations, low actuation voltage, and large elastic restoring force for reliability considerations. Cantilever beam actuator designs help address and minimize external effects from packaging stresses, especially over temperature. However, in the typical electrostatic cantilever beam switch design the signal capacitor head is located at the distal end of the beam beyond the actuator motor region which in turn makes for a tightly coupled and difficult problem when trying to minimize the actuation pull-in voltage while at the same time trying to maximize the elastic restoring force in the beam such that the beam will return to it's initial open unactuated state.

The electrostatic actuation pull-in voltage can be decreased by increasing the electrostatic force or by decreasing the beam bending stiffness or both. The electrostatic force may be increased by either increasing the actuator area, decreasing the separation gap between stationary and movable electrodes, or both. Cantilever beam bending stiffness may be decreased by any combination of decreasing the material stiffness, decreasing the moment of inertia (i.e. thickness and width), or increasing the length of the beam. To a first order, the actuation pull-in voltage for a cantilever beam will remain constant when varying the width of the beam due to the offsetting effects of linearly increasing electrostatic force and bending stiffness. While increasing the beam/actuator length has the desirable effect of decreasing actuation pull-in voltage, it also has the undesirable effect of reducing the stored elastic energy in a deflected beam due to the decrease in bending stiffness of the beam.

Embodiments of the Present Invention

Figure 4:
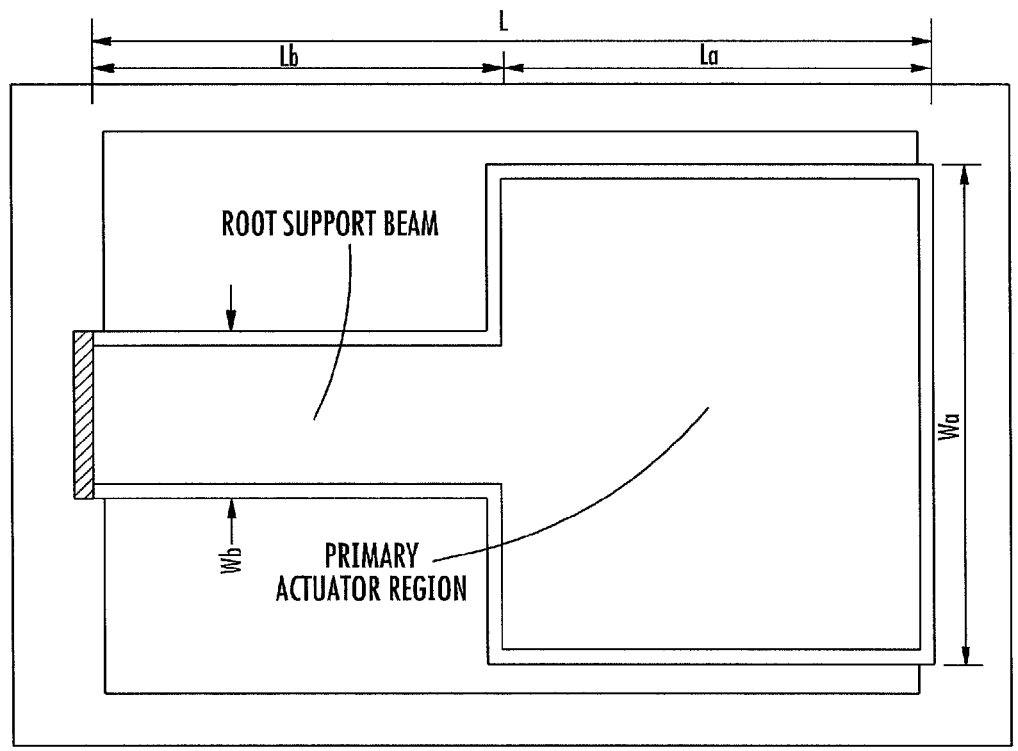
FIG. 4 illustrates a first embodiment of a MEMS low voltage cantilever actuator in accordance with the present invention.

In the first embodiment of a MEMS low voltage cantilever actuator the beam bending stiffness is decreased, without increasing beam length, by decreasing the beam width near the beam root to yield a device as shown in FIG. 4. In this design the bending stiffness is decreased, relative to the previously described straight uniform prismatic cantilever beam, by decreasing the width of the beam for a length (Lb<L) less than the total length of the actuator. The intent of narrowing the width of the beam near the root anchor is to decrease the bending stiffness of the beam while at the same time trying to minimize the decrease in the bending moment from the electrostatic force from the associated loss of electrostatic actuator area. The more distal the actuator area is from the beam root anchor, the more it contributes to the electrostatic bending moment due to the simple effect of the moment arm length and also to the gap geometry between stationary and movable actuator plates as the beam deflects. There is a design tradeoff for pull-in voltage and elastic restoring force as a function of the narrow width support beam length (Lb) and width (Wb), and the length and width of the primary electrostatic actuator area (La,Wa). This design will have a lower pull-in voltage, less elastic restoring force for a given beam tip displacement, and a lower torsional rigidity about the longitudinal axis when compared to a straight prismatic cantilever beam actuator occupying the same rectangular footprint defined by length L and width Wa. A version of this low voltage design with the same pull-in voltage as a straight cantilever beam would be shorter in overall length, and have an approximately comparable or larger restoring force for a given beam displacement. The MEMS cantilever electrostatic actuator depicted in FIG. 4 may be used in applications for either a capacitive contact or ohmic (DC) contact switching device, and may make use of the aforementioned standoff bumps. This design strategy, used to lower the pull-in actuation voltage of a single anchor point cantilever beam, may also be applied to MEMS electrostatic actuators with multiple anchor points and suspension beam members such as a doubly supported beam.

In the second embodiment of a MEMS low voltage cantilever actuator the beam stiffness is decreased by the removal of beam material about the longitudinal center line near the beam root as shown in FIG. 5A. In this design the bending stiffness is decreased, relative to the previously described straight uniform prismatic cantilever beam, by decreasing the width of the beam for a length (Lb<L) less than the total length of the actuator. The intent of narrowing the width of the beam near the root anchor is to decrease the bending stiffness of the beam while at the same time trying to minimize the decrease in the bending moment from the electrostatic force from the associated loss of electrostatic actuator area. The more distal the actuator area is from the beam root anchor, the more it contributes to the electrostatic bending moment due to the simple effect of the moment arm length and also to the gap geometry between stationary and movable actuator plates as the beam deflects.

Figure 6:
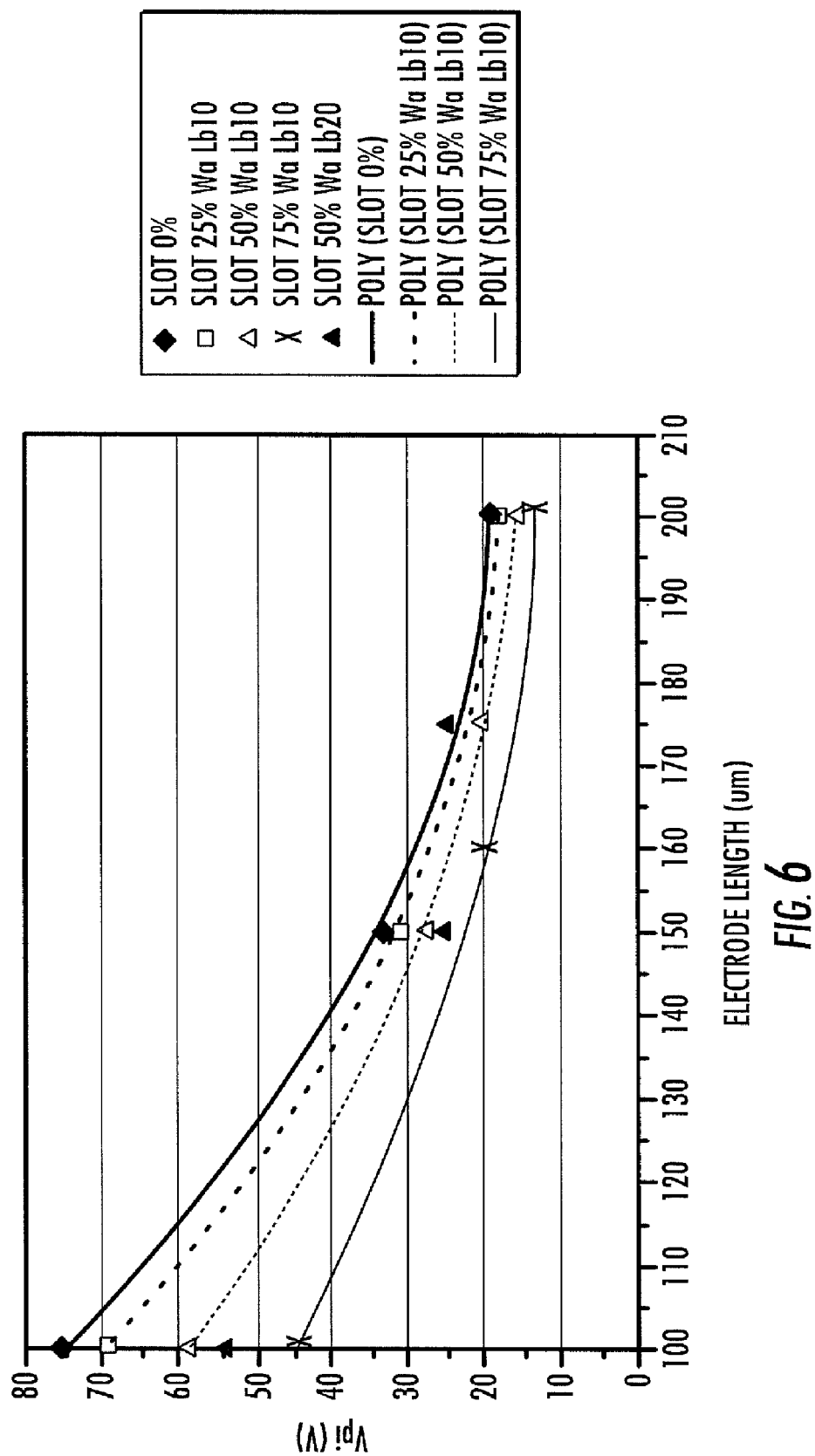
FIG. 6 illustrates the effect of removing beam material near the beam root upon pull-in voltage.

There is a design tradeoff for pull-in voltage and elastic restoring force as a function of the narrow width support beam length (Lb) and width (Wb), and the length and width of the majority electrostatic actuator area (La,Wa). This design will have a lower pull-in voltage, less elastic restoring force for a given beam tip displacement, and a slightly reduced torsional rigidity about the longitudinal axis when compared to a straight prismatic cantilever beam actuator occupying the same rectangular footprint defined by length L and width Wa. A version of this low voltage design with the same pull-in voltage as a straight cantilever beam would be shorter in overall length, and have a comparable or larger restoring force for a given beam displacement. The effect of removing beam material near the beam root upon pull-in voltage can be seen in the representative design curves of pull-in voltage (Vpi) as a function of total actuator length (L=Lb+La) as shown in FIG. 6 for different root slot widths ((Wa−2Wb)/Wa %) and slot lengths Lb=10 um or Lb=20 um. This embodiment of a low voltage actuator would have a larger torsional rigidity about the longitudinal axis and more sensitivity to substrate effects in the lateral beam direction as compared to the first embodiment. This embodiment of a MEMS cantilever electrostatic actuator may be used in applications for either a capacitive contact or ohmic (DC) contact switching device as depicted in FIG. 5B, and may make use of the aforementioned standoff bumps. This design strategy, used to lower the pull-in actuation voltage of a single anchor point cantilever beam, may also be applied to MEMS electrostatic actuators with multiple anchor points and suspension beam members such as a doubly supported beam.

Figure 7A:
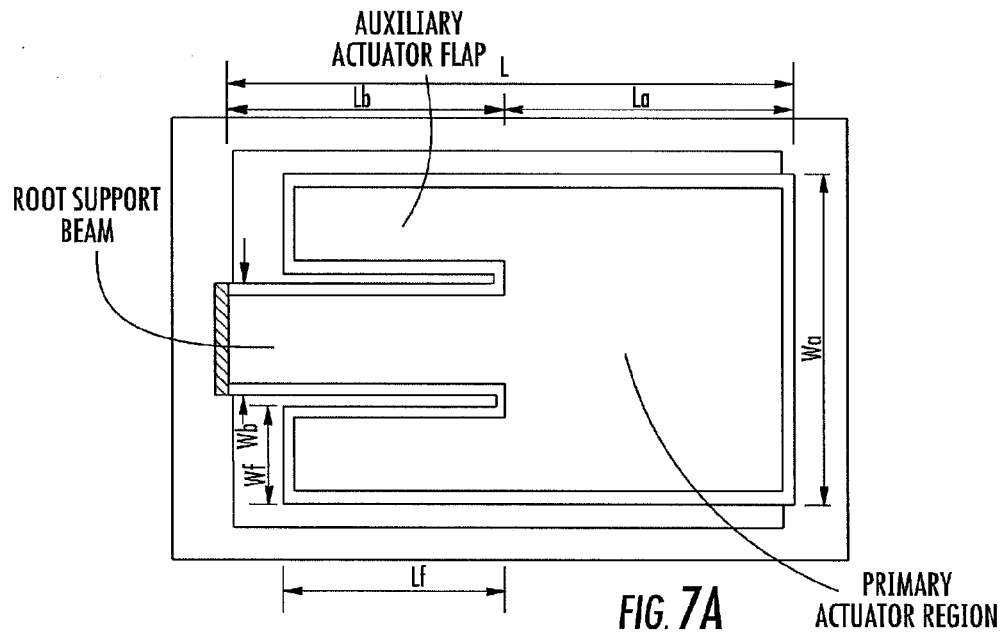
FIG. 7A illustrates a third embodiment of a MEMS low voltage cantilever actuator in accordance with the present invention.
Figure 7B:
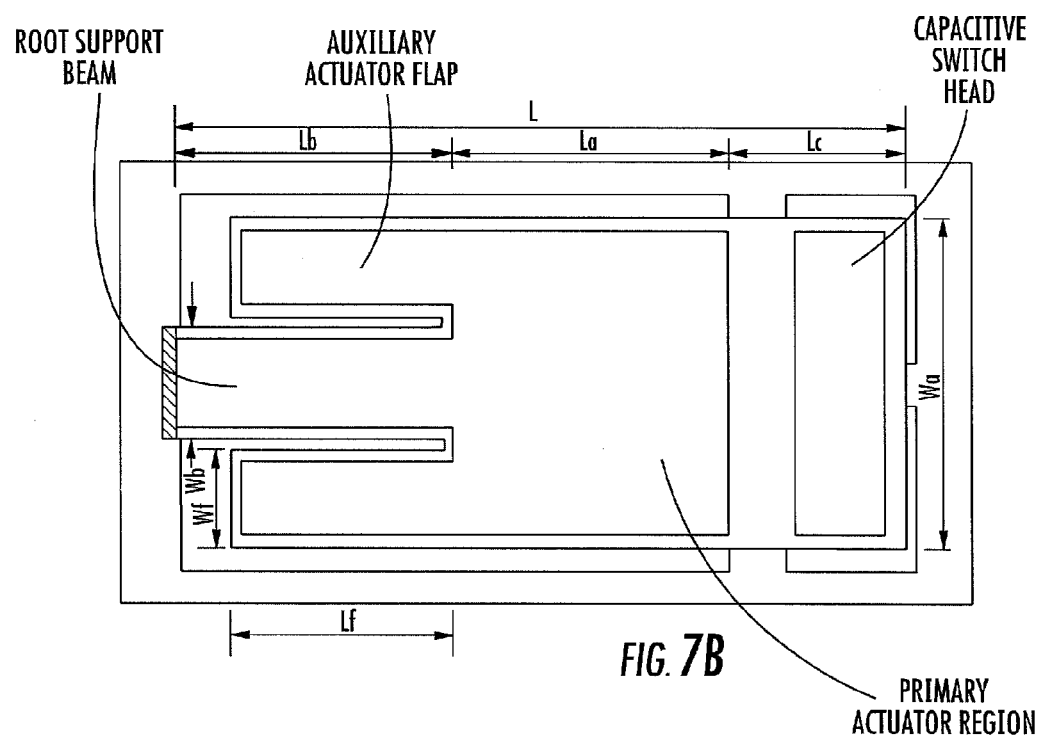
FIG. 7B illustrates the embodiment of FIG. 7A used as a capacitive contact or ohmic (DC) contact switching device.
Figure 7C:
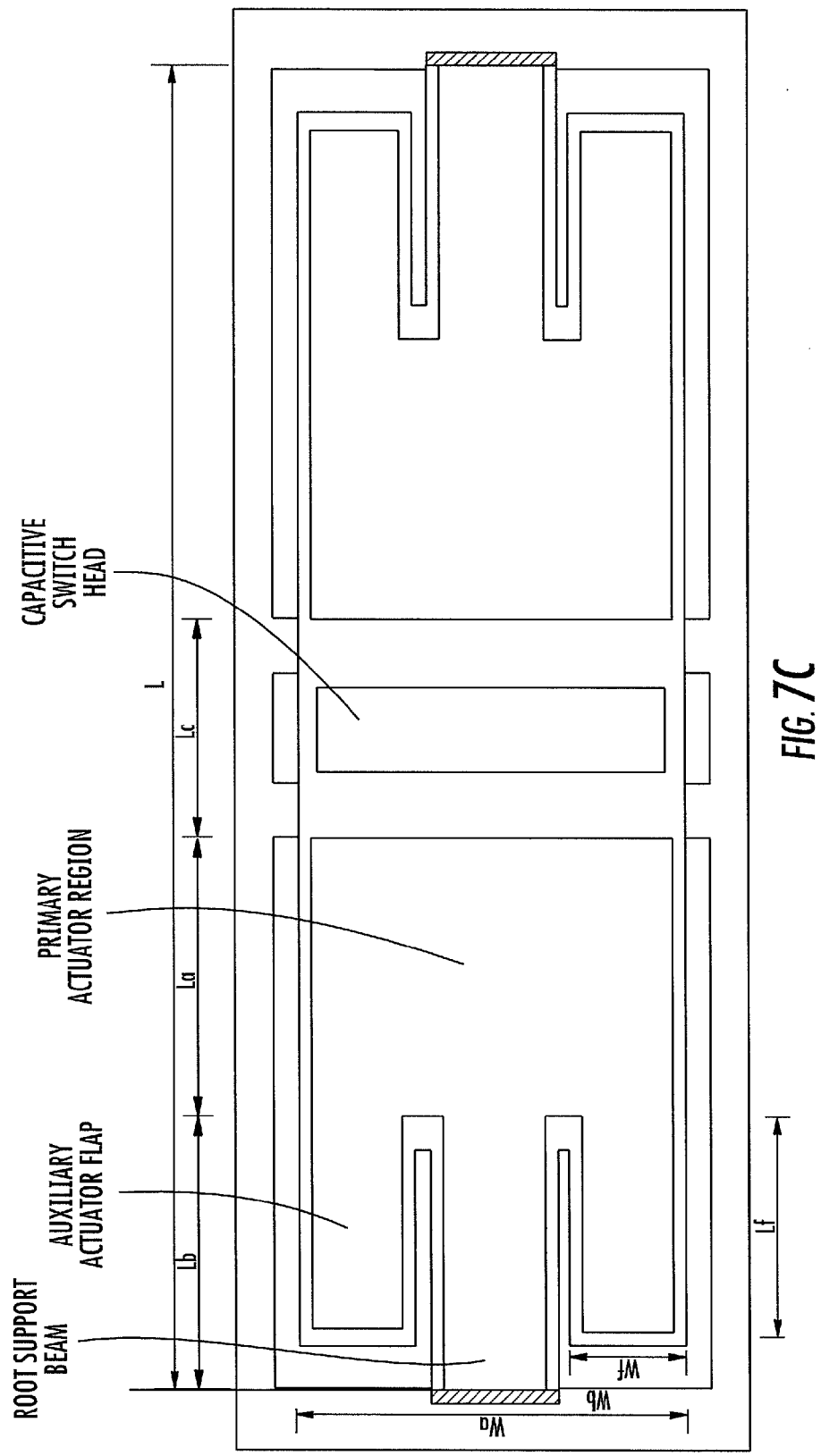
FIG. 7C illustrates an analogous doubly-supported embodiment of FIG. 7B in accordance with the present invention.
Figure 8:
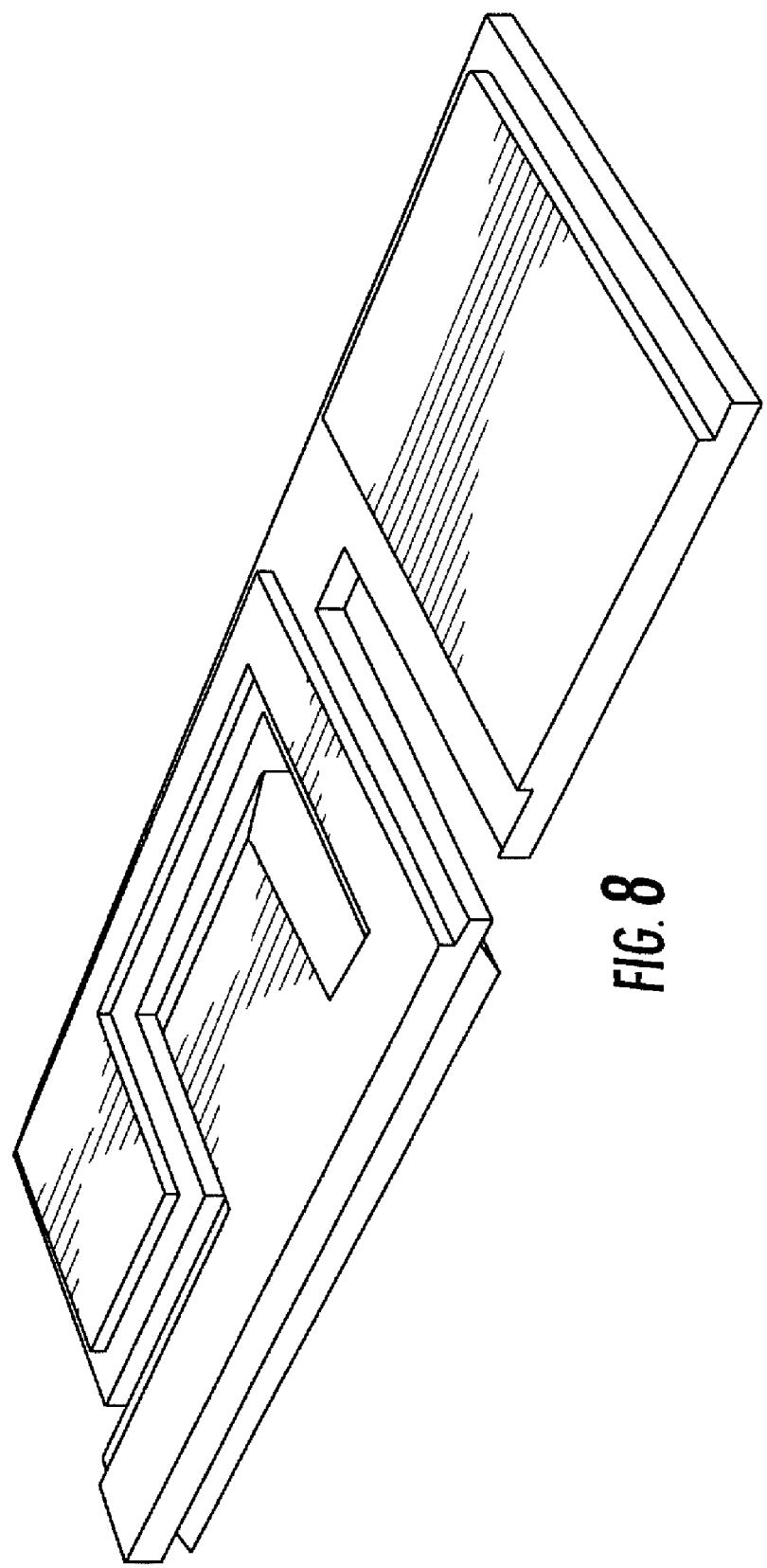
FIG. 8 illustrates an example of a "folded cantilever" design which exhibits translational motion of the primary actuator and capacitive switch head regions.

In the third embodiment of a MEMS low voltage cantilever actuator the beam stiffness is decreased by the removal of beam material in a narrow slotting fashion such that bending stiffness is decreased in the beam root region similar to that of embodiment one, while minimizing the overall loss of electrostatic actuator area as shown in FIG. 7A. Alternatively, this design may be viewed as that shown in embodiment one with the addition of auxiliary actuation area. The actuation pull-in voltage for this design is primarily a function of the bending moment from the primary actuator defined by the actuation area ($La*Wa$) and the moment arm defined by the center of electrostatic pressure ($Lb+\sim La/2$), the stiffness of the root beam defined by its width Wb and length Lb, and by the area from the auxiliary actuation flaps defined by Wf and Lf. This embodiment of a MEMS cantilever electrostatic actuator may be used in applications for either a capacitive contact or ohmic (DC) contact switching device as depicted in FIG. 7B. This embodiment of a MEMS electrostatic actuator with multiple anchor points and suspension beam members is depicted in the doubly supported structure in FIG. 7C. The design architecture of this invention helps to ease the design tradeoffs required between achieving a low actuation voltage while maintaining a large restoring force for self actuation and reliability considerations. This is achieved by decoupling the moment arm to the electrostatic center of pressure of the actuator motor ($Lb+\sim La/2$) from the moment arm to the center of the signal capacitor head region by "folding" the actuator region over with the capacitor head region attached at the "fold" of the actuator. In the simplest sense the capacitor head is located at position other than the distal end of the folded actuator motor. This allows for the bending moment from the electrostatic force to be increased by placing actuator area at an increased moment arm length from the beam root while minimizing the deleterious effect of increasing the moment arm length to the signal capacitor head region. The specific bending/deformation of the overall structure may be controlled through the design of the auxiliary actuator flaps. Through design of the auxiliary actuator flaps, primary actuator region and root support beams, the entire structure may deflect due to electrostatic forces such that the tip of the primary actuator region touches down first, or such that the tip of the auxiliary actuator flap near the root anchor touches down first followed by a "zipping" motion of the rest of the structure, or such that the beam bending occurs almost entirely in the root support beam along with an essentially translational motion of the primary and auxiliary actuator regions. An example of a "folded cantilever" design which exhibits essentially translational motion of the primary actuator and capacitive switch head regions is represented by the half symmetry model shown in FIG. 8.

Additionally, standoff bumps may be incorporated as pivot points to help control the rotational motion of the entire structure during switch closure and to limit contact area for reliability concerns upon switch closure. Alternatively, the standoff bumps could be used in conjunction with the auxiliary actuation flaps to help "pop" open the switch by countering effects that tend to maintain the switch in a closed state such as the presence of DC and RF induced electrostatic forces along with other adhesive forces associated with two surfaces in intimate contact. This design will have a lower pull-in voltage, less elastic restoring force for a given beam tip displacement, and reduced torsional rigidity about the longitudinal axis when compared to a straight prismatic cantilever beam actuator occupying the same rectangular footprint defined by length L and width Wa. A version of this low voltage design with the same pull-in voltage as a straight cantilever beam would be shorter in overall length, and have comparable or better restoring force for a given beam displacement when compared to the straight cantilever design. A version of this low voltage design with the same pull-in voltage as the design of embodiment one would be shorter in overall length, and have equal or better restoring force for a given beam displacement when compared to the embodiment one design. This design strategy, used to lower the pull-in actuation voltage of a single anchor point cantilever beam, may also be applied to MEMS electrostatic actuators with multiple anchor points and suspension beam members such as a doubly supported beam.

Figure 9C:
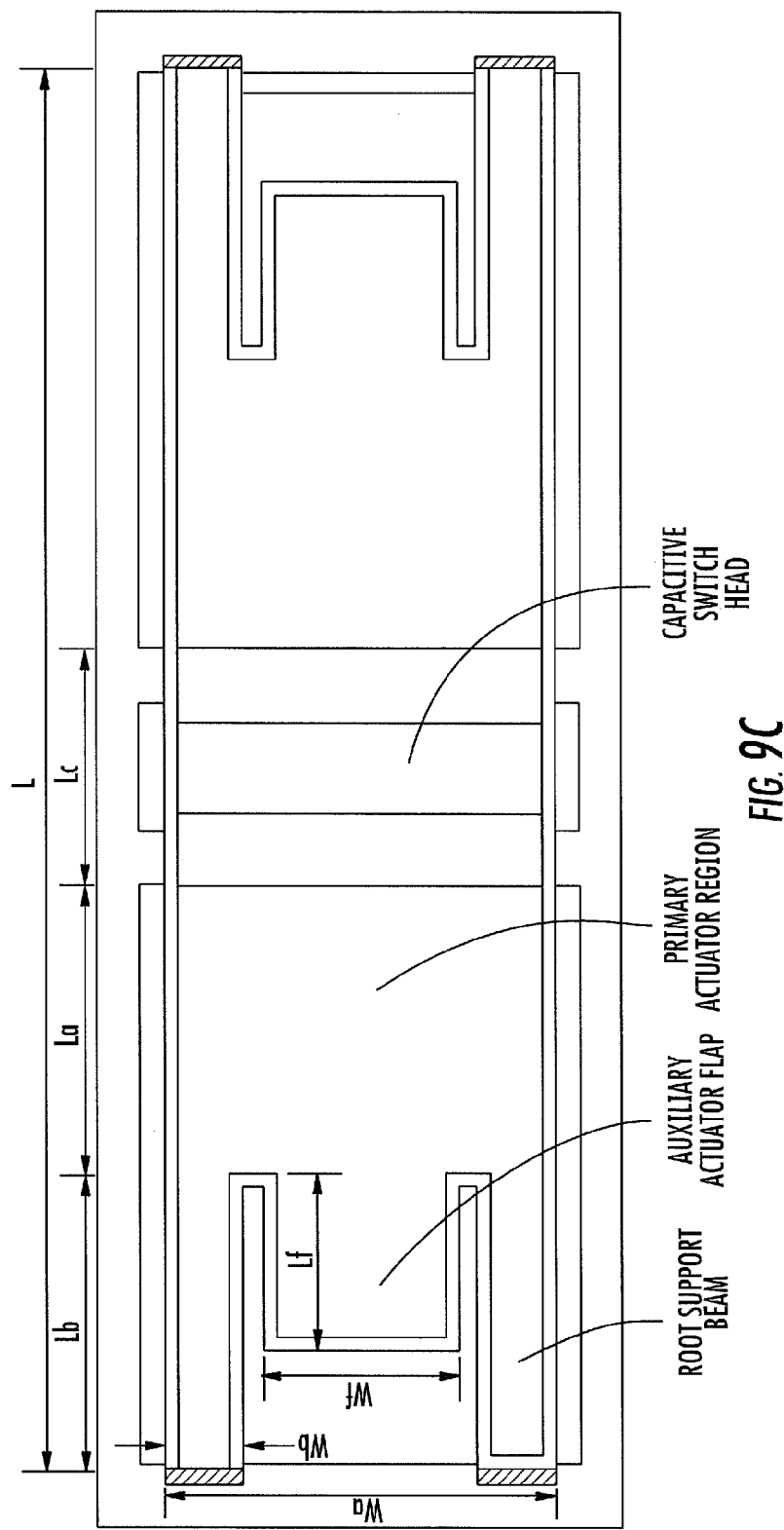
FIG. 9C illustrates an analogous doubly-supported embodiment of FIG. 9B in accordance with the present invention.

In the fourth embodiment of a MEMS low voltage cantilever actuator the beam stiffness is decreased by the removal of beam material in a narrow slotting fashion such that bending stiffness is decreased in the beam root region similar to that of embodiment two, while minimizing the overall loss of electrostatic actuator area as shown in FIG. 9A. Alternatively, this design may be viewed as that shown in embodiment two with the addition of auxiliary actuation area. The actuation pull-in voltage for this design is primarily a function of the bending moment from the primary actuator defined by the actuation area ($La*Wa$) and the moment arm ($Lb+\sim La/2$), the stiffness of the root beam defined by its width Wb and length Lb, and by the area from the auxiliary actuation flaps defined by Wf and Lf. This embodiment of a MEMS cantilever electrostatic actuator may be used in applications for either a capacitive contact or ohmic (DC) contact switching device as depicted in FIG. 9B. The design architecture of this invention helps to ease the design tradeoffs required between achieving a low actuation voltage while maintaining a large parasitic voltage and large restoring force. This is achieved by decoupling the moment arm to the electrostatic center of pressure of the actuator motor ($Lb+\sim La/2$) from the moment arm to the center of the signal capacitor head region by "folding" the actuator region over with the capacitor head region attached at the "fold" of the actuator. In the simplest sense the capacitor head is located at position other than the distal end of the actuator motor. This allows for the bending moment from the electrostatic force to be increased by placing actuator area at an increased moment arm length from the beam root while minimizing the deleterious effect of increasing the moment arm length to the signal capacitor head region. The specific bending/deformation of the overall structure may be controlled through the design of the auxiliary actuator flaps. Through design of the auxiliary actuator flaps, primary actuator region and root support beams, the entire structure may deflect due to electrostatic forces such that the tip of the primary actuator region touches down first, or such that the tip of the auxiliary actuator flap near the root anchor touches down first followed by a "zipping" motion of the rest of the structure, or such that the beam bending occurs almost entirely in the root support beam along with an essentially translational motion of the primary and auxiliary actuator regions. In addition, standoff bumps may be incorporated as pivot points to help control the rotational motion of the entire structure during switch closure and to limit contact area for reliability concerns upon switch closure. Alternatively, the standoff bumps could be used in conjunction with the auxiliary actuation flaps to help "pop" open the switch by countering effects that want to keep the switch closed such as the presence of DC and RF induced electrostatic forces along with other adhesive forces associated with surfaces in intimate contact. This design will have a lower pull-in voltage, less elastic restoring force for a given beam tip displacement, and a slightly reduced torsional rigidity about the longitudinal axis when compared to a straight prismatic cantilever beam actuator occupying the same rectangular footprint defined by length L and width Wa. A version of this low voltage design with the same pull-in voltage as a straight cantilever beam would be shorter in overall length, and have comparable or larger restoring force for a given beam displacement when compared to the straight cantilever design. A version of this low voltage design with the same pull-in voltage as the design of embodiment two would be shorter in overall length, and have equal or better restoring force for a given beam displacement when compared to the embodiment two design. This design strategy, used to lower the pull-in actuation voltage of a single anchor point cantilever beam, may also be applied to MEMS electrostatic actuators with multiple anchor points and suspension beam members such as a doubly supported beam. This embodiment of a MEMS electrostatic actuator using multiple anchor points and suspension beam members is depicted in the doubly supported structure in FIG. 9C.

Problems solved by the invention

The design techniques presented in this invention disclosure enable a certain amount of decoupling between the normally tightly coupled MEMS cantilever beam actuator performance parameters of actuation voltage, restoring force, self actuation voltage, and small size. In particular it helps in the design optimization problem by enabling the designer to decrease the actuation pull-in voltage in a desirable fashion while at the same time minimizing the decrease in restoring force and/or self actuation voltage. Alternatively, the designer may be able to decrease the size of a given actuator while maintaining a substantially equivalent pull-in voltage, restoring force, and self actuation voltage. In general, the smaller a MEMS structure can be made, the more robust the design will be to process variations and residual stresses.

Ramifications

These design concepts allow for the creation of MEMS structures with lower pull-in actuation voltages, and/or smaller sized structures that maintain restoring force for reliable contact mode operation.

SUMMARY

A cantilever beam actuator in accordance with the present invention has a beam width that is narrow towards the support anchor point and wider towards the distal end of the actuator electrode. Such an actuator can use standoff features to control beam displacement/travel, pivot points to control beam motion upon actuation, and/or pivot points to control beam motion upon release/de-activation.

Another cantilever beam electrostatic actuator in accordance with the present invention can have two narrow width support/actuator beams located symmetrically off the center line to support a wider actuation plate. Such an actuator can use standoff features to control beam displacement/travel, pivot points to control beam motion upon actuation, and/or pivot points to control beam motion upon release/de-activation. Further, such a beam actuator can have a narrow support/actuator beam located on the center line supporting a wider actuator plate area along with actuator area adjacent to either side of the support beam, and further such an actuator can have with two narrow width support/actuator beams located symmetrically off the center line to support a wider actuation plate, and have auxiliary actuator plate(s) located between the support beams and symmetrically about the beam center line. Again, such an actuator can use standoff features to control beam displacement/travel, pivot points to control beam motion upon actuation, and/or pivot points to control beam motion upon release/de-activation.

Conclusion

The present invention discloses cantilever beam electrostatic actuators and other analogous electrostatic actuators supported by the substrate at one or more points.

A cantilever beam electrostatic actuator in accordance with one or more embodiments of the present invention comprises a first actuator beam having a first width at a support anchor point and a second width at a distal end of the cantilever beam electrostatic actuator, wherein the first width is narrower than the second width, and a second actuator beam, wherein the first actuator beam and the second actuator beam are symmetric about a center line of the cantilever beam electrostatic actuator.

Such a cantilever beam electrostatic actuator may further optionally comprise a standoff feature, the standoff feature controlling a displacement of the first actuator beam, the first actuator beam motion upon actuation, the first actuator beam motion upon deactivation, at least one auxiliary actuator flap, coupled to the cantilever beam electrostatic actuator opposite the distal end of the cantilever beam electrostatic actuator, the at least one auxiliary actuator flap being coupled to the cantilever beam electrostatic actuator between the first actuator beam and the second actuator beam, and a standoff feature, the standoff feature controlling a displacement of the first actuator beam, the first actuator beam motion upon actuation, and the first actuator beam motion upon deactivation.

An actuator in accordance with one or more embodiments of the present invention comprises an actuator region, having a first width, a beam, having a second width, coupled between an edge of the actuator region and a pivot point, the beam being approximately centered on the actuator region, wherein the second width is narrower than the first width, and at least one auxiliary actuator flap, coupled to the actuator region, the at least one auxiliary actuator flap coupled to the actuator region along the edge of the actuator region, the at least one auxiliary actuator flap being farther away from a centerline of the actuator than the beam.

Such an actuator further may optionally comprise a standoff feature, the standoff feature controlling a displacement of the beam, beam motion upon actuation, and beam motion upon deactivation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A cantilever beam electrostatic actuator, comprising:
an actuator region having a first width;
a first actuator support beam coupled to the actuator region, the first actuator support beam having a second width at a first support anchor point;
a second actuator support beam coupled to the actuator region, the second actuator support beam having a third width at a second support anchor point; and
at least one auxiliary actuator flap coupled to the actuator region along an edge of the actuator region;
wherein both of the second width and the third width are narrower than the first width; and
wherein the first actuator support beam and the second actuator support beam are symmetric about a center line of the cantilever beam electrostatic actuator.

2. The cantilever beam electrostatic actuator of claim 1, further comprising a standoff feature.

3. The cantilever beam electrostatic actuator of claim 2, wherein the standoff feature controls a displacement of the first actuator support beam.

4. The cantilever beam electrostatic actuator of claim 2, wherein the standoff feature controls first actuator support beam motion upon actuation.

5. The cantilever beam electrostatic actuator of claim 2, wherein the standoff feature controls first actuator support beam motion upon deactivation.

6. The cantilever beam electrostatic actuator of claim 5, wherein the at least one auxiliary actuator flap is coupled to the cantilever beam electrostatic actuator opposite the distal end of the cantilever beam electrostatic actuator.

7. The cantilever beam electrostatic actuator of claim 6, wherein the at least one auxiliary actuator flap is coupled to the cantilever beam electrostatic actuator between the first actuator support beam and the second actuator support beam.

8. The cantilever beam electrostatic actuator of claim 7, further comprising a standoff feature.

9. The cantilever beam electrostatic actuator of claim 8, wherein the standoff feature controls a displacement of the first actuator support beam.

10. The cantilever beam electrostatic actuator of claim 8, wherein the standoff feature controls first actuator support beam motion upon actuation.

11. The cantilever beam electrostatic actuator of claim 8, wherein the standoff feature controls first actuator support beam motion upon deactivation.

12. An actuator, comprising
an actuator region, having a first width;
a beam, having a second width, coupled between an edge of the actuator region and a pivot point, the beam being approximately centered on the actuator region, wherein the second width is narrower than the first width, and
at least one auxiliary actuator flap, coupled to the actuator region, the at least one auxiliary actuator flap coupled to the actuator region along the edge of the actuator region, the at least one auxiliary actuator flap being farther away from a centerline of the actuator than the beam.

13. The actuator of claim 12, further comprising a standoff feature.

14. The actuator of claim 12, wherein the standoff feature controls a displacement of the beam.

15. The actuator of claim 12, wherein the standoff feature controls beam motion upon actuation.

16. The actuator of claim 12, wherein the standoff feature controls beam motion upon deactivation.

* * * * *